US008630383B2

(12) United States Patent
de Lind van Wijngaarden et al.

(10) Patent No.: US 8,630,383 B2
(45) Date of Patent: Jan. 14, 2014

(54) COMMUNICATION SYSTEM FOR TRANSMITTING SYNC-FLAGS AND PILOT SYMBOLS AND METHOD THEREOF

(75) Inventors: Adriaan J. de Lind van Wijngaarden, New Providence, NJ (US); Gerhard G. T. Kramer, Chatham, NJ (US); Carl J. Nuzman, Union, NJ (US); Philip A. Whiting, New Providence, NJ (US)

(73) Assignee: Alcatel Lucent, Paris (FR)

( * ) Notice: Subject to any disclaimer, the term of this patent is extended or adjusted under 35 U.S.C. 154(b) by 1216 days.

(21) Appl. No.: 12/230,080

(22) Filed: Aug. 22, 2008

(65) Prior Publication Data

US 2010/0046684 A1 Feb. 25, 2010

(51) Int. Cl.
*H04L 7/06* (2006.01)

(52) U.S. Cl.
USPC .......................................... 375/364; 375/295

(58) Field of Classification Search
USPC ...................... 375/295, 354, 355, 364, 316
See application file for complete search history.

(56) References Cited

U.S. PATENT DOCUMENTS

| | | | |
|---|---|---|---|
| 5,949,814 A | 9/1999 | Odenwalder et al. | |
| 5,991,308 A | 11/1999 | Fuhrmann et al. | |
| 2004/0005887 A1* | 1/2004 | Bahrenburg et al. | 455/422.1 |
| 2009/0175156 A1* | 7/2009 | Xu | 370/201 |
| 2009/0245081 A1* | 10/2009 | Ashikhmin et al. | 370/201 |
| 2009/0310502 A1* | 12/2009 | Nuzman et al. | 370/252 |
| 2010/0034249 A1* | 2/2010 | Schenk et al. | 375/227 |

FOREIGN PATENT DOCUMENTS

| | | |
|---|---|---|
| EP | 0 921 652 | 6/1999 |
| WO | WO 2006/048090 | 5/2006 |

OTHER PUBLICATIONS

ITU-T, Series G: Transmission Systems and Media, Digital System and Networks, Very high speed digital subscriber line transceivers 2 (VDSL2), Feb. 2006.*
Telecommunication Standardization Sector, Study Group 15, G.vdsl: Using orthogonal pilot sequences for assisting FEXT channel estimation in vector transmission, Jan. 2007.*
International Search Report and written Opinion by PCT dated Mar. 3, 2011 for International Application No. PCT/US2009/054434.
International Search Report and written Opinion by PCT dated Dec. 22, 2009 for International Application No. PCT/US2009/054434.
Article by Upzide Labs of Oct. 2006—"Pilot sequence assisted vector channel estimation"—International Telecommunication Union, pp. 1-6.
Article by Texas Instruments of Apr. 2004—"Initialization for VDSL2"— International Telecommunication Union, pp. 1-15.
Article by Ericsson of Jun. 2006—"Uplink Non-data-associated Control Signaling".

* cited by examiner

*Primary Examiner* — Chieh M Fan
*Assistant Examiner* — Freshteh N Aghdam
(74) *Attorney, Agent, or Firm* — Harness, Dickey & Pierce

(57) ABSTRACT

The present invention relates to a communication system and method for transmitting sync flags and pilot symbols during sync symbol periods. Example embodiments provide a method for sharing sync symbols to communicate flag sequences and pilot sequences during a sequence of sync symbol periods. The method includes modulating the pilot sequence by multiplying a pilot code by each value of the pilot sequence, and modulating the flag sequence by multiplying a flag code by each value of the flag sequence. The pilot and flag codes are mutually orthogonal to each other and each includes at least two non-zero values. The method further includes generating a resulting sync symbol sequence based on the modulated pilot sequence and modulated flag sequence, and sending the resulting sync symbol sequence during the sync symbol period.

19 Claims, 6 Drawing Sheets

COMMUNICATION SYSTEM FOR TRANSMITTING SYNC-FLAGS AND PILOT SYMBOLS AND METHOD THEREOF

BACKGROUND

In the legacy Very High Speed Digital Subscriber Line 2 ("VDSL2") standard, sync symbols occur periodically after every 256 data symbols. On a particular legacy VDSL2 communication line, one or more tones (i.e. subcarriers) transmit a sync symbol including one of two values during a sync symbol period. Typically all tones transmit the same sync symbol value in a given sync symbol period (when defining the value to be the value before any quadrant scrambling). The values may be real or complex. Real values may be represented by "1" or "−1." The complex values may be may be 00 corresponding to "1+j" or 11 corresponding to "−1−j". Normally, the value transmitted on all tones is the same from one sync symbol to the next sync symbol. For example, a central office may transmit downstream the value "1" repeatedly on all active tones. When the central office receives an online reconfiguration request (OLR) from a customer-side equipment, the central office may then switch the value to "−1" and transmit "−1" repeatedly to the customer-side equipment. Such a transition is interpreted by the customer-side equipment as an acknowledgment of the OLR. Such an acknowledgment is referred to hereinafter as a sync-flag. A sequence of "1" values and "−1" values that is used to convey sync-flags (or the absence of a sync flag) will be referred to hereinafter as a flag sequence.

In the emerging G.vector amendment to the VDSL2 standard, the current consensus is that pilot signals will be transmitted on sync symbols. For example, pilot sequences may be sent instead of flag sequences downstream on sync symbols during the sync symbol periods to estimate crosstalk on communication lines. For instance, a pilot sequence may be assigned to each communication line of the communication system and the pilot sequences may be sent downstream to the customer-side equipment. At the customer-side equipment, error samples are determined and fed back to the central office. At the central office, the error samples are correlated with the pilot sequences in order to obtain estimates for all of the crosstalk coefficients. The process of obtaining error samples may be repeated as needed to obtain a more accurate crosstalk estimate. These estimates will then be used to cancel crosstalk using precoding. Each symbol of the pilot sequence may be similar in nature to the legacy sync symbol. For instance, each symbol of the pilot sequence may also include the real or complex values of the legacy sync symbols.

A conventional method for transmitting both the pilot sequences and flag sequences on sync symbols consists of time-sharing the sync symbols. For example, odd-numbered sync symbols are used to send arbitrary pilot sequences (e.g., consisting of "1"s and "−1"s). Even-numbered sync symbols are used to communicate flag sequences. That is, the sync-flag is conveyed whenever an even-numbered sync symbol is opposite in sign from the previous even-numbered sync symbol. As a result of time-multiplexing the pilot sequences and flag sequences, sync-flags can only be sent half as often as compared to a system that sends flag sequences on a separate communication line. For example, using time-multiplexing, sync-flags can only be sent after every 513 Discrete Multitone (DMT) symbols. Assuming the symbol rate is 4 kHz, the amount of time may be increased by up to 64 ms relative to a system sending only flag sequences.

FIG. 1 illustrates a conventional time division scheme to transmit pilot sequences and flag sequences on the sync symbols. Referring to FIG. 1, the center row of the figure, labeled "sync symbols", illustrates a complex constellation point sent on eight consecutive sync symbols. The odd symbols are interpreted as pilot values, and are used to transmit the pilot sequence (+1,−1,−1,+1). The even symbols are used to convey four flag values (e.g., labeled "sync bits" in FIG. 1), and are used to transmit the flag sequence (+1, +1, +1, −1). A sync-flag is indicated by the signal change from the $6^{th}$ sync symbol value to the $8^{th}$ sync symbol value, or equivalently from the $3^{rd}$ flag value to the $4^{th}$ flag value.

The main shortcoming of the time division scheme is evident when the customer-side equipment includes a legacy modem and/or when a communication line is a legacy VDSL2 communication line. A communication line having a legacy modem on the customer-side equipment is hereinafter referred to as a legacy communication line. A communication line having a modem on the customer-side equipment adhering to the G.vector amendment is hereinafter referred to as a G.vector communication line.

When legacy communication lines and G.vector communication lines are both present in a communication system, the sync symbols on the legacy communication line, which conveys only flag values, may interfere with the crosstalk estimation being performed by the G.vector communication lines. For example, if a communication system has four G.vector communication lines, the pilot sequences may be (1,1,1,1), (1,1,−1,−1), (1,−1,1,−1) and (1,−1,−1,1). Each pilot sequence is assigned to each of the four G.vector communication lines, respectively, and transmitted repeatedly on the sync symbols during the sync period. Then to estimate the crosstalk from the second communication line into the third communication line, a sequence of four error samples measured at the customer-side equipment of the third communication line would be correlated with the pilot sequence of (1,1,−1,−1) assigned to the second G.vector communication line. Crosstalk from the other G.vector communication lines would not affect this measurement because of the orthogonality of the pilot sequences.

If the same communication system includes a legacy communication line, the central office would send sync symbols on the legacy communication line by sending flag value "1" repeatedly on all active tones until the central office received an OLR from the customer-side equipment, at which point the central office would acknowledge receipt of the OLR by sending a sync-flag by starting to send the flag value "−1" repeatedly on all active tones. If the resulting flag sequence sent on the legacy communication line happened to be (1,1,−1,−1), coinciding with the pilot sequence sent on the second G.vector communication line, then the crosstalk estimate from the second G.vector communication line into the third G.vector communication line would be corrupted by crosstalk from the legacy communication line.

As a result, the flag sequence on a legacy communication line may coincide with or be strongly correlated with the pilot sequence sent on one of the G.vector communication lines. Therefore, the crosstalk estimate of the G.vector communication lines may be contaminated by the crosstalk from the legacy communication line. For example, if a crosstalk coefficient from the G.vector communication line is $g_1$ and a crosstalk coefficient from the legacy communication line is $g_2$, a mean value of the contaminated crosstalk estimate is $g_1+\rho g_2$, where $\rho$ is the correlation coefficient between the flag sequence sent on the legacy communication line and the pilot sequence of G.vector communication line, assuming the flag and pilot sequence are transmitted at equal power. Depending on the conditions of the communication system, $\rho$ may be as large as 1. As a result, the error percentage may be as much as 100% error when $g_1$ and $g_2$ have similar magnitudes.

SUMMARY

The present invention relates to a communication system and method for transmitting flag sequences and pilot sequences during sync symbol periods. In particular, the system and method prevents flag sequences from interfering with crosstalk estimation among the G.vector communication lines, and prevents pilot sequences from interfering with detection of sync-flags.

Example embodiments provide a method for sharing sync symbols to communicate flag sequences and pilot sequences during a sequence of sync symbol periods. The method includes modulating the pilot sequence by multiplying a pilot code by each value of the pilot sequence, and modulating the flag sequence by multiplying a flag code by each value of the flag sequence. The pilot and flag codes are mutually orthogonal to each other and each includes at least two non-zero values. The method further includes generating a resulting sync symbol sequence based on the modulated pilot sequence and modulated flag sequence, and sending the resulting sync symbol sequence during the sequence of the sync symbol periods.

The method may further include transforming each sync symbol of the resulting sync symbol sequence into a signal for transmission across a communication line. The resulting sync symbol sequence includes adding the modulated pilot sequence and the modulated flag sequence. The values of the flag and pilot codes may be complex numbers. Each value of the pilot sequence and the flag sequence may be one of two real or complex values.

The method may further include allocating sync symbol power between the pilot sequence and the flag sequence by adjusting a first and second parameters of the pilot and flag codes. According to example embodiments, the flag code is (a, a) and the pilot code is (b, −b), wherein $$a = \frac{\alpha}{\sqrt{2}}(1+j), b = \frac{\beta}{\sqrt{2}}(1-j),$$

wherein $\alpha^2 + \beta^2 = 1$, and wherein $\alpha$ and $\beta$ are the first and second parameters of the flag and pilot codes. The pilot sequence may be used for crosstalk estimation and the flag sequence may be used to send sync flags.

According to another example embodiment, a method for sharing sync symbols to receive flag sequences and pilot sequences during a sync symbol period may include receiving a resulting sync symbol sequence during the sync symbol period. The resulting sync symbol sequence includes the flag sequence and pilot sequence. The method may further include recovering the pilot sequence by correlating the resulting sync symbol sequence with a pilot code, and recovering the flag sequence by correlating the resulting sync symbol sequence with a flag code. The pilot and flag codes are mutually orthogonal to each other and may include at least two non-zero values.

The flag sequence may be recovered by multiplying elements of the resulting sync symbol sequence by corresponding elements of the flag code and summing the products to generate a value of the recovered flag sequence. The pilot sequence may be recovered by multiplying elements of the resulting sync symbol sequence by corresponding elements of the pilot code and summing the products to generate a value of the recovered pilot sequence.

According to another example embodiment, a communication system for sharing sync symbols to communicate flag sequences and pilot sequences may include a first modulator configured to modulate the pilot sequence by multiplying a pilot code by each value of the pilot sequence, a second code modulator configured to modulate the flag sequence by multiplying a flag code by each value of the flag sequence, and a combiner configured to combine the modulated pilot sequence with the modulated flag sequence to generate a resulting sync symbol sequence. The pilot and flag codes may include at least two non-zero values. The pilot and flag codes are mutually orthogonal to each other.

The communication system may further include a channel modulator configured to send the resulting sync symbol sequence by transforming each sync symbol of the resulting sync symbol sequence into a channel signal for transmission across a communication line. For example, in a VDSL2 system, one component of the channel modulator would take the inverse Fourier transform of a vector specifying the sync symbol value assigned to each tone, in order to produce a vector of time domain samples. The communication system is configured to allocate sync symbol power between the pilot sequence and the flag sequence by adjusting a first and second parameter of the pilot and flag codes.

According to another example embodiment, a communication system for sharing sync symbols to receive flag sequences and pilot sequences may include a channel demodulator configured to receive a resulting sequence of channel signals, each of which is typically affected by noise and interference. The channel demodulator takes each of the noisy received channel signals and produces a corresponding noisy sync symbol, using channel demodulation techniques well-known to those skilled in the art. The resulting sequence of noisy sync symbols, is processed by a first code demodulator configured to recover the pilot sequence by correlating the resulting sync symbol sequence with a pilot code and produce a noisy version of the pilot sequence, and a second code demodulator configured to recover the flag sequence by correlating the resulting sync symbol sequence with a flag code.

The communication system may further include a first estimation system configured to receive the noisy version of the pilot sequence and generate an estimated pilot sequence based on one of two possible pilot values for the values of the pilot sequence, and a second estimation system configured to receive the noisy version of the flag sequence and generate an estimated flag sequence based on one of two possible flag values for the values of the flag sequence.

The communication system may further include a combiner configured to combine the estimated pilot sequence from the noisy version of the pilot sequence to generate a pilot error sequence, and an error feedback unit configured to transmit the pilot error sequence to be used in crosstalk estimation.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
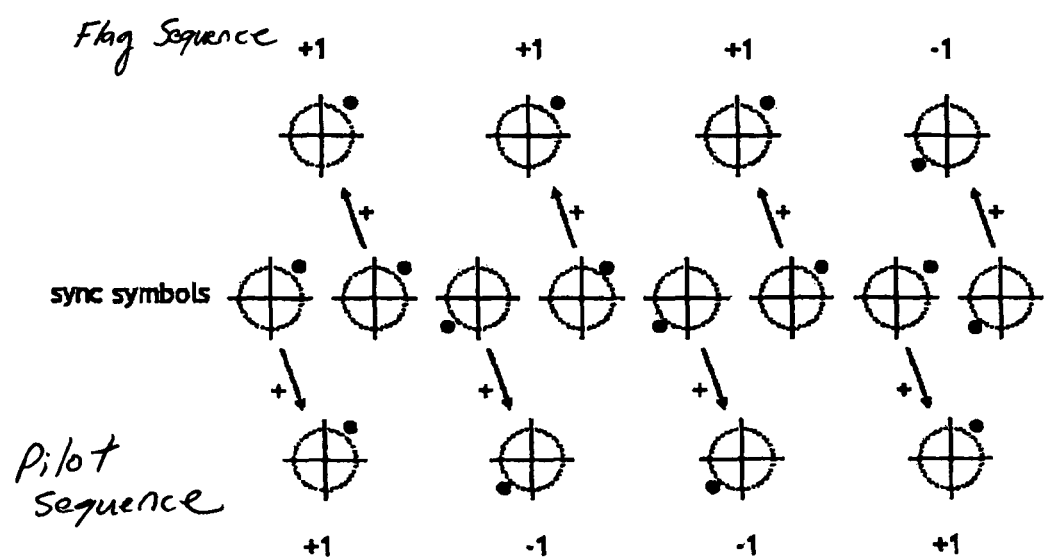
FIG. 1 illustrates a conventional time division scheme to transmit pilot signals and sync symbols.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
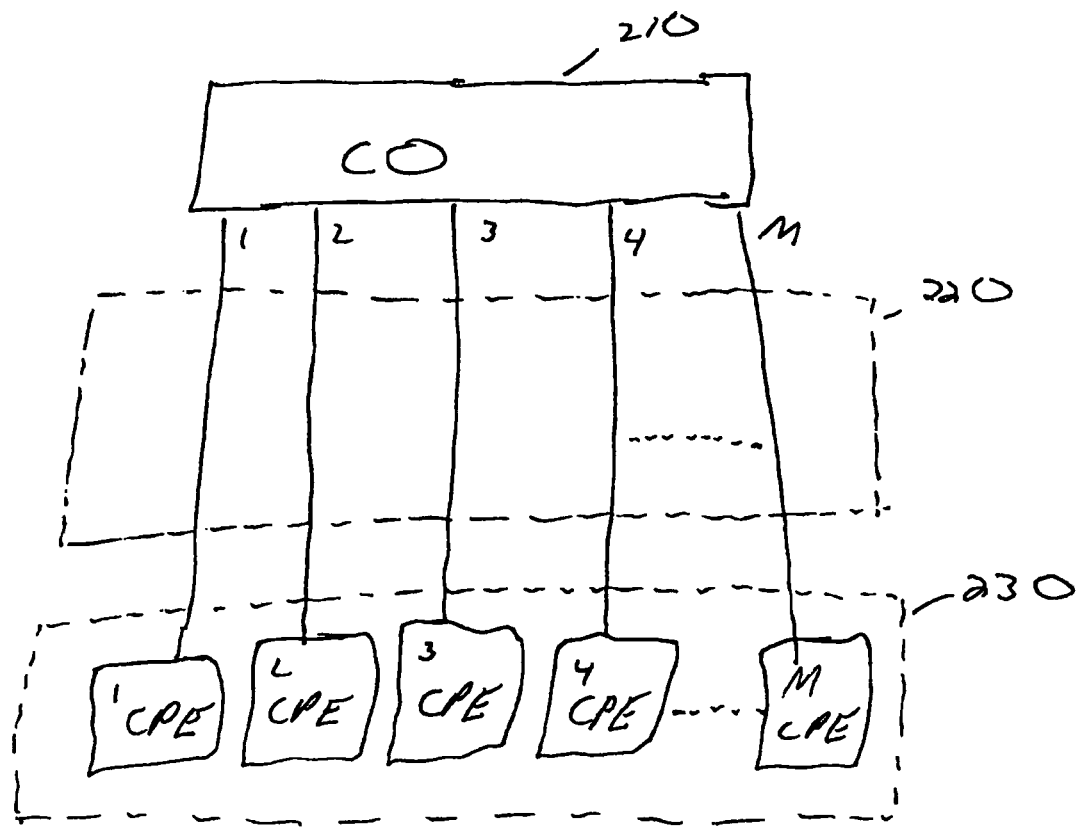
FIG. 2 illustrates a communication system to communicate flag sequences and pilot sequences during a sync symbol period according to example embodiments.

FIG. 2 illustrates a communication system to communicate flag sequences and pilot sequences during a sync symbol period according to example embodiments. The communication system includes a central office (CO) 210, a vectoring group 220 including M communication lines, and a plurality of M customer-side equipment (CPEs) 230, with one CPE terminating each communication line.

The CO 210 may include a plurality of operator-side modems, each connected to one of the M communication lines, and a vectoring control entity (VCE) which coordinates the transmissions on the communication lines. For example, the vectoring control entity may be configured to coordinate the signals sent on the communication lines by precoding, and to estimate the coefficients of the crosstalk channels between communication lines. The operator-side modems may be configured to adhere to the G.vector amendment to the VDSL2 standard, or to operate according to principles that have been proposed to the G.vector committee.

Each one of the plurality of M CPEs 230 may include a number of communication devices such as a DSL modem, a splitter, and a telephone. The DSL modem may adhere to the current VDSL2 standard. Such a modem is referred to hereinafter as a legacy modem. Alternatively, the modem may adhere to the G.vector amendment of the VDSL2 standard, or, it may adhere to principles that have been proposed to the G.vector committee, such as: measuring error samples relative to sync symbols, and returning error samples to the CO via an upstream feedback channel. Such a modem is referred to hereinafter as a G.vector modem. The integer M indicates the number of CPEs present in the communication system. There may also be other communication lines coming from the CO 210 that are not controlled by the VCE and are not part of the vectoring group 220, and are not depicted in FIG. 2.

The vectoring group 220 includes a plurality of M communication lines. Each one of the plurality of M communication lines may correspond and be connected to one of the plurality of M CPEs 230. The plurality of M communication lines may include a plurality of first communication lines, and at least one second communication line. The first communication lines and the at least one second communication line may be different from each other. For example, if one of the plurality of M CPEs 230 includes a G.vector modem, the corresponding communication line is referred to as a G.vector communication line. If one of the plurality of M CPEs 230 includes a legacy modem, the corresponding communication line is referred to as a legacy communication line. Example embodiments of the present invention also include where each of the plurality of M communication lines is the same type of communication line.

Referring to FIG. 2, the CO 210 is configured to transmit sync symbols that communicate pilot sequences and flag sequences according to example embodiments. The pilot sequences are used to estimate crosstalk coefficients between the plurality of M communication lines, and the flag sequences are used to communicate sync-flags from the CO 210 to the plurality of M CPE modems.

Figure 3:
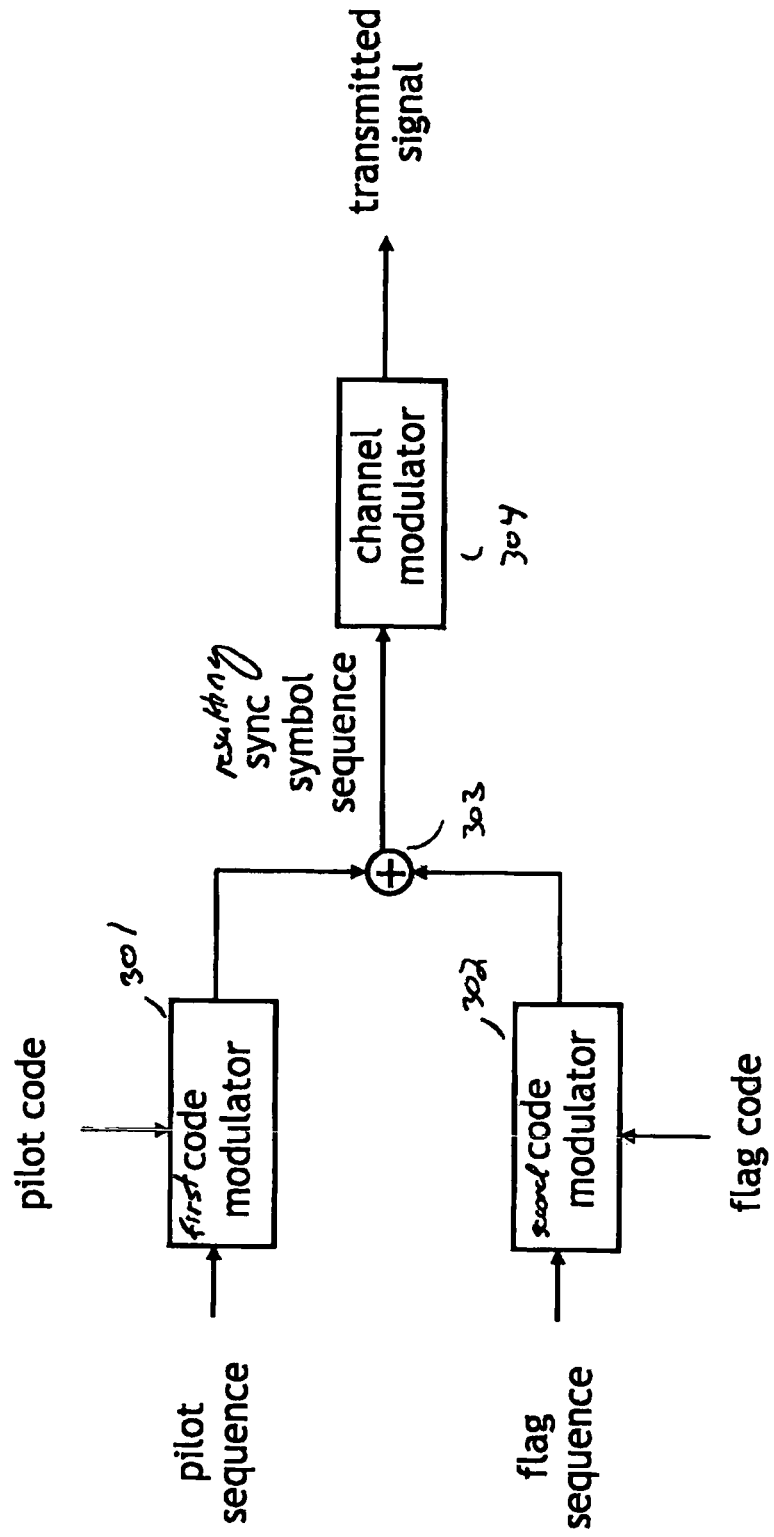
FIG. 3 illustrates a modulation system according to example embodiments.

FIG. 3 illustrates a modulation system that is part of CO 210 according to example embodiments. The CO 210 may include a first code modulator 301, a second code modulator 302, a combiner 303, and a channel modulator 304.

The first code modulator 301 is configured to receive a pilot sequence. The pilot sequence is a sequence of values; for example, the values may include either "1" or "−1". The length of the pilot sequence is L, where L is an integer greater than or equal to 1. The first code modulator 301 is also configured to receive a pilot code. The pilot code is a fixed sequence of length C, where each element of the pilot code includes a complex number and/or at least two elements of the pilot code are non-zero.

The first code modulator 301 is configured to modulate the pilot sequence by multiplying each value of the pilot sequence by a pilot code. For instance, the first code modulator 301 forms a Kronecker product of the pilot sequence with the pilot code. Thus, if the pilot sequence is of length L, the first code modulator 301 forms an encoded sequence of length CL. Each element of the original pilot sequence is replaced in the encoded sequence of length CL by a sub-sequence of length C obtained by multiplying each value of the pilot code by the given element of the original pilot sequence.

The second code modulator 302 is configured to receive a flag sequence. The flag sequence is also a sequence of values; for example, the values may include either "1" or "−1". The length of the flag sequence is L, where L is an integer greater than or equal to 1. The second code modulator 302 is also configured to receive a flag code. Similar to the pilot code, the flag code is a fixed sequence of length C, where each element of the flag code includes a complex number and/or at least two non-zero values.

The second code modulator 302 is configured to modulate the flag sequence by multiplying each value of the flag sequence by a flag code. Similar to the first code modulator 301, the second code modulator 302 forms a Kronecker product of the flag sequence with the flag code. That is, if the flag sequence is of length L, the second code modulator 302 forms an encoded sequence of length CL. Each element of the original flag sequence is replaced in the encoded sequence of length CL by a sub-sequence of length C obtained by multiplying each value of the flag code by the given element of the flag sequence. The flag code and the pilot code are preferably mutually orthogonal to each other. Details of the pilot and flag code will be further described later.

The combiner 303 is configured to receive both the encoded pilot sequence and the encoded flag sequence and to add the encoded pilot sequence to the encoded flag sequence to obtain a resulting sync symbol sequence of length CL.

The channel modulator 304 is configured to transform each sync symbol of the resulting sync symbol sequence into a channel signal suitable for transmission across a communication line within the plurality of M communication lines. Then, the resulting channel signal sequence is transmitted to a corresponding CPE during a sequence of the sync periods, with 256 data signals transmitted between each consecutive pair of sync symbols. This transformation may include subsystems commonly used in DSL transmitters, such as scramblers, and Fourier transformation.

Figure 4:
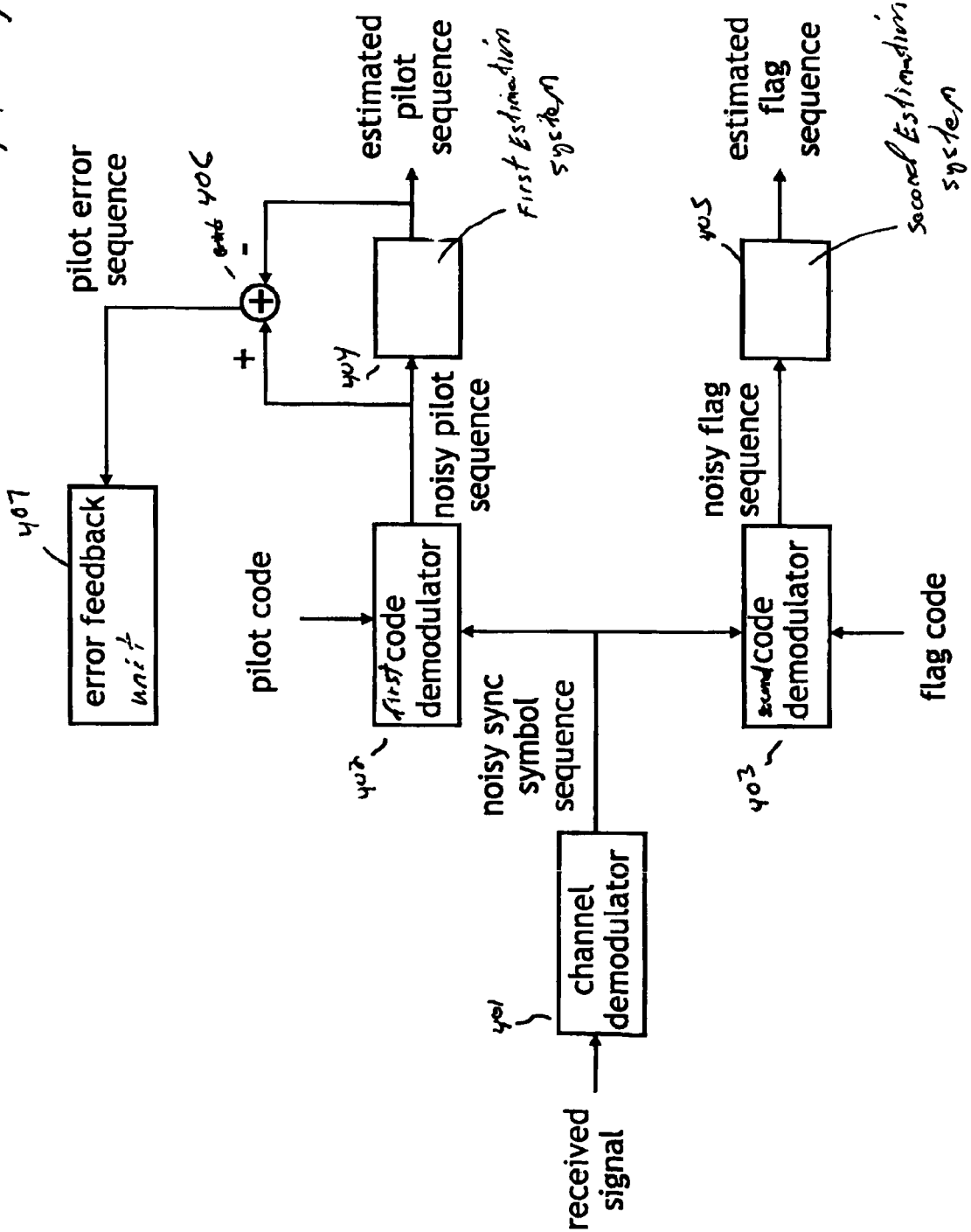
FIG. 4 illustrates a demodulation system according to example embodiments.

FIG. 4 illustrates a system that is part of a CPE according to an example embodiment. The CPE is configured to receive the transmitted signal and recover both the pilot sequence and the flag sequence. The CPE includes a channel demodulator 401, a first code demodulator 402, a second code demodulator 403, a first estimation system 404, a second estimation system 405, a combiner 406 and an error feedback unit 407.

The channel demodulator 401 is configured to receive a noisy version of the signal transmitted by the CO during a sync symbol period and generate a complex value that is a noisy received sync symbol. The channel demodulator 401 performs the inverse operation of the channel modulator 304, and may include subsystems commonly used in DSL receivers, such as a descrambler, a Fourier transform and frequency-domain equalization. The noisy sync symbols produced by the channel modulator 304 during CL consecutive sync symbol periods produce a noisy sync symbol sequence of length CL. The noisy version of the transmitted resulting sync symbol sequence is the transmitted resulting sync symbol sequence of length CL, corrupted by background noise as well as by interference from signals transmitted on other communication lines during sync symbol periods.

Referring to the lower branch, the second code demodulator 403 is configured to correlate the noisy sync symbol sequence with a flag code to generate a noisy flag sequence. In an example embodiment, the flag code used at the CPE in FIG. 4 is equal to or proportional to the flag code used in FIG. 3, and is orthogonal to the pilot code used in FIG. 3. To perform the demodulation, the second code demodulator multiplies each of C consecutive noisy sync symbols by the complex conjugate of a corresponding one of C flag code values. The C products resulting from each of these multiplications are summed to produce a single noisy flag value. In this way, a sequence of CL noisy sync symbols is demodulated to produce a noisy flag sequence of length L. This operation will be further explained with reference to FIG. 5.

The second estimation system 405 is configured to receive the noisy flag sequence and generate an estimated flag sequence. For each noisy flag value, the second estimation system 405 estimates which of two possible flag values was originally sent by the CO 210. The second estimation system 405 may be a slicer, for example.

As a result, the channel demodulator 401, the second code demodulator 403 and the second estimation system 405 depicted in FIG. 4 recovers the flag sequence from the transmitted resulting sync symbol sequence by generating an estimated flag sequence. In a system with multiple tones, the estimator may take into account the received values on multiple tones.

Referring to the upper branch, the first code demodulator 402 is configured to correlate the noisy sync symbol sequence with the pilot code to generate a noisy pilot sequence. In an example embodiment, the pilot code used at the CPE in FIG. 4 is equal to or proportional to the pilot code used in FIG. 3, and is orthogonal to the flag code used in FIG. 3. To perform the correlation, the first code demodulator 402 multiplies each of C consecutive noisy sync symbols by the complex conjugate of a corresponding one of C pilot code values. The C products resulting from each of these multiplications are summed to produce a single noisy pilot value. In this way, a sequence of CL noisy sync symbols is demodulated to produce a noisy pilot sequence of length L. This operation will be further explained with reference to FIG. 5.

The first estimation system 404 is configured to receive the noisy pilot sequence and generate an estimated pilot sequence. For each noisy pilot value, the first estimation system 404 estimates which of several possible pilot values was originally sent by the CO. For example, for a binary pilot sequence, the estimator may estimate whether the initial pilot value was "1" or "−1". The first estimation system 404 may be a slicer, for example.

The combiner 406 is configured to subtract the estimated pilot value from the noisy pilot sequence in order to obtain a pilot error sample, which in general consists of background noise and interference from other communication lines.

The error feedback unit 407 is configured to transmit a sequence of the pilot error samples back to the CO 210, to be used in crosstalk estimation. In an alternative example embodiment, the pilot values of the pilot error sequence may be known a priori. In this case, the first estimation system is not needed, and error samples are determined by subtracting the known pilot value from the noisy pilot value.

Advantageously, only one error sample needs to be sent back for every group of C received sync symbols. The upstream bandwidth required to feed back the error samples is therefore C times less than would be required by a system that feeds back an error sample for each sync symbol.

According to an example embodiment, the values of the flag code and the pilot code may include at least two non-zero values. In a particular example embodiment of including at least two non-zero values, the length of the pilot code and the flag code may be C=2. The flag code to modulate the flag sequence is of the form (a, a) and the pilot code to modulate the pilot sequence is of the form (b,−b), where a=b=√2/2. The flag code (a, a) and the pilot code (b,−b) are orthogonal to each other.

In this particular example embodiment, to calculate and send a resulting sync symbol sequence of a flag value "1" and a pilot value "−1" based on the pilot and flag code (b,−b) and (a,a), the resulting sync symbol sequence is 1·(a,a)+(−1)·(b,−b)=(a−b, a+b). The pilot value is recovered as (a−b,a+b)·(a, a)=2a$^2$=1, and the sync value is recovered as (a−b,a+b)·(b,−b)=−2b$^2$=−1.

According to another example embodiment, the values of the pilot and flag codes may be complex. For example, the complex values of the pilot and flag codes may be actual constellation points sent on VDSL2 sync symbols such as "1+j" and "−1−j". In this particular example embodiment, the flag code may be (a,a) to modulate the flag sequence, and the pilot code may be (b,−b) to modulate the pilot sequence, where a and b are any complex constellation point. The flag code for demodulation might be (1,1) and the pilot code for demodulation might be (1,−1).

In this particular example embodiment, a and b may be as follows:

$$a = \frac{\alpha}{\sqrt{2}}(1+j), b = \frac{\beta}{\sqrt{2}}(1-j),$$

where $\alpha^2+\beta^2=1$, and where $\alpha$ and $\beta$ are first and second parameters of the flag and pilot codes.

Figure 5:
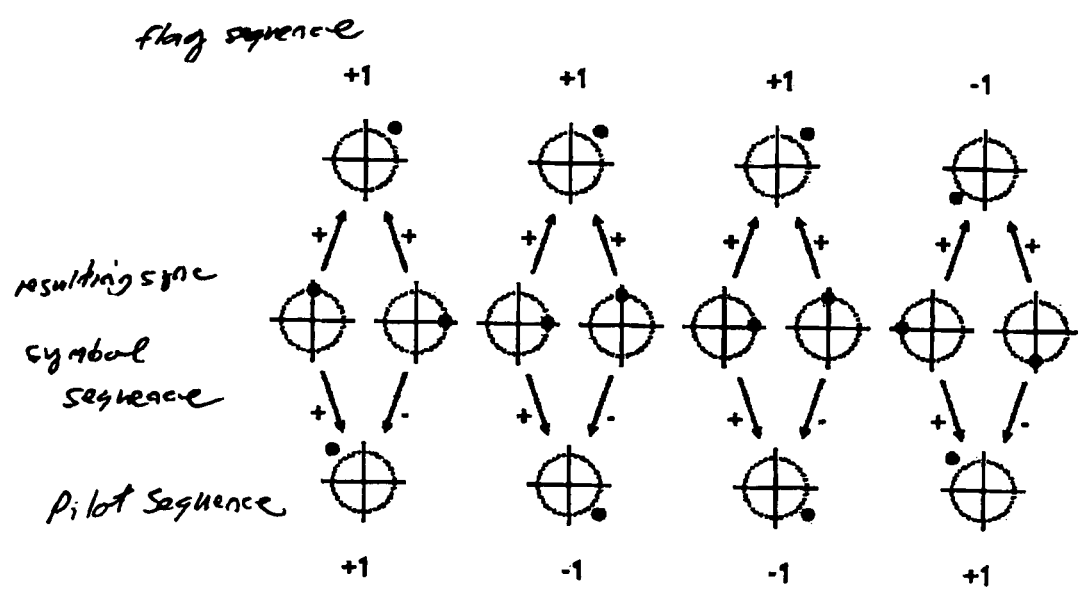
FIG. 5 illustrates a diagram depicting the transmitted resulting sync symbol sequence, the recovered pilot sequence and recovered flag sequence according to example embodiments.

FIG. 5 illustrates a diagram depicting the transmitted resulting sync symbol sequence, the recovered pilot sequence and flag sequence according to example embodiments. Referring to FIG. 5, the sync symbols (e.g., the middle row) illustrate actual constellation points of the resulting sync symbol sequence. The consecutive pairs of the resulting sync symbol sequence can be added together to obtain the flag values, and the pilot values can be obtained from the difference between the same pair of consecutive sync symbols. In this particular example, the first two values of the consecutive resulting sync symbol sequence are added together to obtain the first value of the flag sequence. The first two values of the consecutive resulting sync symbol sequence are subtracted from each other to obtain the first value of the pilot sequence. In this particular example, the flag sequence is (+1,+1,+1,−1) and the pilot sequence is (+1,−1,−1,+1).

Figure 6:
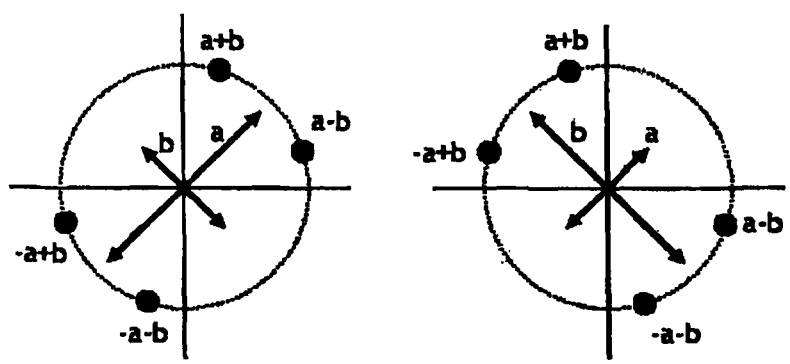
FIG. 6 illustrates the four different complex sync symbols according to example embodiments.

FIG. 6 illustrates the four different complex sync symbols that may arise according to example embodiments, assuming that the pilot sequence and the flag sequence are bipolar, consisting only of values 1 or −1. Under this assumption, the sync symbol may include four possible values: a+b, a−b, −a−b, and −a+b. When a and b are the complex points specified above, each sync symbol has a unit magnitude.

Referring back to FIG. 2, the CO 210 is configured to allocate sync symbol power between the pilot sequence and the flag sequence by adjusting the first and second parameter $\alpha$ and $\beta$ of the flag and pilot codes. By adjusting the first and second parameters $\alpha$ and $\beta$, sync symbol power can be allocated between the pilot sequence and the flag sequence. On the left side of FIG. 6, the first parameter is greater than the second parameter (i.e., $\alpha>\beta$). As a result, more power is allocated to the flag sequence. On the right side of FIG. 6, the first parameter is less than the second parameter (i.e., $\alpha<\beta$). As a result, more power is allocated to the pilot sequence.

In the conventional time-sharing solution, exactly half of the power is used for sending flag sequences, and half is for sending pilot sequences. According to example embodiments, the power allocated to flag sequences may be reduced and more power may be allocated to pilot sequences. The increased power to pilot sequences would allow the crosstalk estimation to take place more quickly. Alternatively, when good crosstalk estimates have already been obtained, the power could be shifted to the flag sequences for increased reliability of sync-flags.

According to example embodiments, power-sharing between flag sequences and pilot sequences is particularly advantageous when a communication line is terminated by a legacy modem. For example, the CO 210 may transmit sync symbols to the legacy modem such that much less power is allocated to a pilot sequence than to a flag sequence. Advantageously, the power assigned to the pilot sequence may be chosen to be small enough so that the ability of the legacy modem to detect sync-flags according to traditional techniques is not substantially reduced. At the same time, the power of the pilot sequence may be chosen to be large enough to influence error measurements on a second communication line, so that it is possible for the VCE to estimate crosstalk from the legacy line into the second line using correlation.

The communication system according to example embodiments is depicted for one tone of one communication line. The operation described above is similarly performed in parallel on other tones and on other communication lines. Example embodiments of the present invention may also be applied in embodiments where some tones and some lines only apply part of the elements depicted in FIGS. 3 and 4. For example, the communication system associated with one given tone and communication line may only send a pilot sequence, the communication system associated with another tone and/or communication line may only send a flag sequence, and the communication system associated with another tone and/or communication line sends both a flag sequence and a pilot sequence. Likewise, at the receiver (e.g., CPE), only flag values may be estimated for some tones and communication lines, only pilot error values may be estimated for some tones and/or communication lines, and both flag values and pilot error values may be estimated for some tones and/or communication lines.

Note that even when one communication line only transmits encoded flag sequences and another line only transmits encoded pilot sequences, crosstalk between lines may often cause a received signal to consist of a sum of an encoded flag sequence and encoded pilot sequence. Thus, the system depicted in FIG. 4 is still needed to separate flag sequences from code sequences even in this case. For example, a CO 210 may use the lower branch depicted in FIG. 3 to send a flag sequence on a first communication line, and simultaneously use the upper branch depicted in FIG. 3 to send a pilot sequence on a second communication line. Due to crosstalk, the received signal at the CPE of the first communication line would include a sum of the signals sent on the first and second communication lines. The CPE of the first communication line may use the lower branch system of FIG. 4 to estimate the flag sequence sent on the first communication line. The pilot sequence sent on the second line would appear as part of the pilot error sequence computed by the upper branch of the system of FIG. 4. Note that, in this case, if the CPE knows that no pilot sequence was sent on the first communication line, then the first estimation system 404 is not needed since the pilot sequence is known to be zero.

Although the illustrated example embodiments used code sequences of length two, example embodiments also encompass embodiments with code sequences of length C>2. In such example embodiments, the code sequences may be orthogonal code sequences of length C. A subset of code sequences may be used to modulate pilot values, and another subset of code sequences may be used to modulate flag values.

The forgoing discussion has focused on downstream transmission of pilot and flag signals from a central office to CPE modems, and on downstream system in which crosstalk is cancelled by precoding. However, the present invention also can be applied to systems in which pilot and flag signals are sent upstream from CPE modems to a central office, and where crosstalk is cancelled by coordinated signal processing at the central office (e.g. by "postcoding").

Example embodiments being thus described, it will be obvious that the same may be varied in many ways. Such variations are not to be regarded as a departure from the invention, and all such modifications are intended to be included within the scope of the invention.

We claim:

1. A method for sharing sync symbols to communicate flag sequences and pilot sequences during a sequence of sync symbol periods, the method comprising:
    modulating the pilot sequence by multiplying a pilot code by each value of the pilot sequence to form an encoded pilot sequence;
    modulating the flag sequence by multiplying a flag code by each value of the flag sequence to form an encoded flag sequence, the pilot and flag codes being mutually orthogonal to each other, the pilot and flag codes each including at least two non-zero values;
    generating a resulting sync symbol sequence based on the encoded pilot sequence and encoded flag sequence such that each value of the encoded pilot sequence and each value of the encoded flag sequence affects more than one sync symbol in the resulting sync symbol sequence; and
    sending the resulting sync symbol sequence during the sequence of sync symbol periods.

2. The method of claim 1, wherein sending the resulting sync symbol sequence includes transforming each sync symbol of the resulting sync symbol sequence into a signal for transmission across a communication line.

3. The method of claim 1, wherein generating the resulting sync symbol sequence includes adding the modulated pilot sequence and the modulated flag sequence.

4. The method of claim 1, wherein the values of the flag and pilot codes are complex numbers.

5. The method of claim 1, wherein each value of the pilot sequence and the flag sequence is one of two real or complex values.

6. The method of claim 1, further comprising:
    allocating sync symbol power between the pilot sequence and the flag sequence by adjusting a first and second parameters of the pilot and flag codes.

7. The method of claim 6, wherein the flag code is (a, a) and the pilot code is (b, −b), wherein $$a = \frac{\alpha}{\sqrt{2}}(1+j), b = \frac{\beta}{\sqrt{2}}(1-j),$$

$\alpha^2+\beta^2=1$, and wherein $\alpha$ and $\beta$ are the first and second parameters of the flag and pilot codes.

8. The method of claim 1, wherein the pilot sequence is used for crosstalk estimation and flag sequence is used to send sync flags.

9. The method of claim 1, wherein the resulting sync symbol sequence includes at least one pair of sync symbols, a sum of the at least one pair of sync symbols being a flag value of the flag sequence, and a difference between the at least one pair of sync symbols being a pilot value of the pilot sequence.

10. A communication system for sharing sync symbols to communicate flag sequences and pilot sequences during a sequence of sync symbol periods, the communication system comprising:
    a first modulator configured to modulate the pilot sequence by multiplying a pilot code by each value of the pilot sequence to form an encoded pilot sequence;
    a second code modulator configured to modulate the flag sequence by multiplying a flag code by each value of the flag sequence to form an encoded flag sequence, the pilot and flag codes being mutually orthogonal to each other, the pilot and flag codes including at least two non-zero values; and
    a combiner configured to combine the encoded pilot sequence with the encoded flag sequence to generate a resulting sync symbol sequence such that each value of the encoded pilot sequence and each value of the encoded flag sequence affects more than one sync symbol in the resulting sync symbol sequence.

11. The communication system of claim 10, further comprising:
    a channel modulator configured to send the resulting sync symbol sequence by transforming each sync symbol of the resulting sync symbol sequence into a signal for transmission across a communication line.

12. The communication system of claim 10, wherein the communication system is configured to allocate sync symbol power between the pilot sequence and the flag sequence by adjusting a first and second parameter of the pilot and flag codes.

13. The communication system of claim 12, wherein the flag code is (a, a) and the pilot code is (b, −b), wherein $$a = \frac{\alpha}{\sqrt{2}}(1+j), b = \frac{\beta}{\sqrt{2}}(1-j),$$

wherein $\alpha^2+\beta^2=1$, and wherein $\alpha$ and $\beta$ are the first and second parameters of the flag and pilot codes.

14. The communication system of claim 10, wherein the pilot sequence is used for crosstalk estimation and flag sequence is used to send sync flags.

15. The communication system of claim 10, wherein the values of the flag and pilot codes are complex numbers.

16. The communication system of claim 10, wherein each value of the pilot sequence and flag sequence is one of two real or complex values.

17. The method of claim 10, wherein the resulting sync symbol sequence includes at least one pair of sync symbols, a sum of the at least one pair of sync symbols being a flag value of the flag sequence, and a difference between the at least one pair of sync symbols being a pilot value of the pilot sequence.

18. A method for sharing sync symbols to communicate flag sequences and pilot sequences during a sequence of sync symbol periods, the method comprising:

modulating the pilot sequence by multiplying a pilot code by each value of the pilot sequence;

modulating the flag sequence by multiplying a flag code by each value of the flag sequence, the pilot and flag codes being mutually orthogonal to each other, the pilot and flag codes each including at least two non-zero values;

generating a resulting sync symbol sequence based on the modulated pilot sequence and modulated flag sequence; and sending the resulting sync symbol sequence during the sequence of sync symbol periods, wherein the flag code is (a, a) and the pilot code is (b, −b), wherein $$a = \frac{\alpha}{\sqrt{2}}(1+j), b = \frac{\beta}{\sqrt{2}}(1-j),$$

wherein $\alpha^2 + \beta^2 = 1$, and wherein $\alpha$ and $\beta$ are the first and second parameters of the flag and pilot codes.

19. A communication system for sharing sync symbols to communicate flag sequences and pilot sequences during a sequence of sync symbol periods, the communication system comprising:

a first modulator configured to modulate the pilot sequence by multiplying a pilot code by each value of the pilot sequence;

a second code modulator configured to modulate the flag sequence by multiplying a flag code by each value of the flag sequence, the pilot and flag codes being mutually orthogonal to each other, the pilot and flag codes including at least two non-zero values; and a combiner configured to combine the modulated pilot sequence with the modulated flag sequence to generate a resulting sync symbol sequence, wherein the flag code is (a, a) and the pilot code is (b, −b), wherein $$a = \frac{\alpha}{\sqrt{2}}(1+j), b = \frac{\beta}{\sqrt{2}}(1-j),$$

wherein $\alpha^2 + \beta^2 = 1$, and wherein $\alpha$ and $\beta$ are the first and second parameters of the flag and pilot codes.

* * * * *